US005525273A

United States Patent [19]
Konuma et al.

[11] Patent Number: 5,525,273
[45] Date of Patent: Jun. 11, 1996

[54] METHOD FOR FORMING AN ELECTRO-OPTICAL DEVICE

[75] Inventors: Toshimitsu Konuma; Takeshi Nishi; Michio Shimizu; Kouji Moriya, all of Kanagawa, Japan

[73] Assignee: Semiconductor Energy Laboratory Co., Ltd., Japan

[21] Appl. No.: 120,794

[22] Filed: Sep. 15, 1993

[30] Foreign Application Priority Data

Sep. 19, 1992 [JP] Japan .................................. 4-275397

[51] Int. Cl.$^6$ ................................................... G02F 1/13
[52] U.S. Cl. ............................ 264/1.38; 264/1.36; 359/51
[58] Field of Search ................................ 264/1.3, 1.4, 22, 264/1.36, 1.38; 359/51, 52

[56] References Cited

U.S. PATENT DOCUMENTS

| | | | |
|---|---|---|---|
| 4,688,900 | 8/1987 | Doanne et al. | 359/52 |
| 4,944,576 | 7/1990 | Lacker et al. | 359/51 |
| 5,270,843 | 12/1993 | Wang | 359/52 |
| 5,303,073 | 4/1994 | Shirota et al. | 359/51 |

*Primary Examiner*—Catherine Timm
*Attorney, Agent, or Firm*—Sixbey, Friedman, Leedom & Ferguson; Gerald Ferguson, Jr.; Jeffrey L. Costellia

[57] ABSTRACT

The present invention provides a method of fabricating a dispersion-type liquid crystal electro-optical device comprising a pair of substrates disposed opposite to each other with a space therebetween and provided with electrodes respectively on their inner surfaces, and a liquid crystal mixture containing a liquid crystal and a transparent resin and sandwiched between the pair of substrates. The method comprises steps of: filling up the space between the pair of substrates with the fluid liquid crystal mixture, applying a voltage across the electrodes to apply an electric field to the fluid liquid crystal mixture to collect the charge of the fluid liquid crystal mixture in the vicinity of the electrodes; and setting the transparent resin. The dispersion-type liquid crystal electro-optical device has a high voltage retention and a low transmissivity in the scattering state, and is capable of clearly displaying pictures at a high contrast ratio.

19 Claims, 5 Drawing Sheets

METHOD FOR FORMING AN ELECTRO-OPTICAL DEVICE

BACKGROUND OF THE INVENTION

1. Field of the Invention

The present invention relates to a method for forming a dispersion-type liquid crystal electro-optical device having high resistance and high voltage retention, in which a resin is cured while a voltage is applied thereto.

2. Description of the Prior Art

Various liquid crystal displays having large display areas and large display capacities and employing liquid crystal materials have been proposed and put to practical use. For example, M. Schadt, et al. published the results of a study of twisted nematic liquid crystals (TN liquid crystals) in Applied Physics Letter, 18 (14), 127 (1971). TN liquid crystals are currently the most popular liquid crystals applied to liquid crystal watches and liquid crystal television receivers. T. J. Scheffer, et al. published a study of a supertwisted nematic display (STN display) in Applied Physics Letter, 45, 1021 (1984). This STN display proposed by T. J. Scheffer, et al. is widely applied to word processors and the like. A ferroelectric liquid crystal published by Clark, et al. in Applied Physics Letter, 36, 899 (1980) is expected to be used as a material for large capacity displays due to its excellent memorizing characteristics.

All of these known displays employ polarizing plates. Since the polarizing plates have a transmissivity on the order of 40% and the display is generally provided with two polarizing plates, the total transmissivity of the two polarizing plates is in the range of 20 to 30%, hence the brightness of such displays is low.

A dispersion-type liquid crystal display not employing polarizing plates, proposed to solve such problems in conventional liquid crystal displays will be described below with reference to FIG. 1. A cell is formed by injecting mixed liquid crystals of a standard nematic liquid crystal and an uncured resin in cells between two substrates 100 and 100' located opposite each other and respectively provided with electrodes 101 and 101' facing each other. Next, the uncured liquid crystal mixture is cured from the outside by a suitable curing means. If the uncured resin is an ultraviolet-curing resin, this means is the emission of ultraviolet light onto the cells. If the uncured resin is an epoxy resin, the means is heat radiation. By this means the resin is cured and separated from the mixture of liquid crystals and resin. When curing the liquid crystal mixture under specific conditions, it reaches a state where the resin 103 captures innumerable spherical liquid crystal balls 102. This type of composition is necessary for dispersion-type liquid crystals. This is because incoming light is scattered by the spherical liquid crystal balls 102. The respective refractive indices of the liquid crystal and the resin must be controlled to enhance the light scattering effect of the liquid crystal cell. If the refractive index of the liquid crystal coincides with that of the resin when an electric field is applied to the liquid crystal cell, the liquid crystal cell consisting of the spherical liquid crystal balls and the resin becomes optically homogeneous and, consequently, the incoming light travels rectilinearly through the liquid crystal cell. If the electric field is removed, the difference between the respective indices of the liquid crystal and the resin increases and, consequently, the incoming light is refracted and scattered by the spherical liquid crystal balls. This is called a dispersion-type liquid crystal cell (also known as a PDLC).

Thus the dispersion-type liquid crystal produces scattering and transmissivity states by controlling the application of the electric field to make the refractive index of the liquid crystal within the cell agree or disagree with that of the resin. Accordingly, a polarizing plate is unnecessary and transmissivity in the transmissive state is in the range of 80 to 90%, which is approximately equal to the transmissivity of transparent glass.

Thus, dispersion-type liquid crystal displays having high transmissivity are a very effective display means for projection-type television displays etc. which require a large quantity of projected light. The dispersion-type liquid crystal cell is white in the scattering state when the electric field is removed, and is black in a projecting state if the liquid crystal cell is covered with a mask provided with a fixed aperture to intercept scattered light, and is sufficient to be used in a dispersion-type liquid crystal projection-type television. It is also promising as a direct-view type display such as an electronic display which has the appearance of paper.

Although the dispersion-type liquid crystal display has the foregoing excellent properties, it has been difficult to increase the resistance thereof. This problem is a serious impediment to the practical application of dispersion-type liquid crystal displays. The resolution of this problem will be described below.

Firstly, the liquid crystal material to be used in a dispersion-type liquid crystal display will be described. In order to increase the scattering effect of the dispersion-type liquid crystals, it is necessary to increase the difference in refractive index between the resin and the liquid crystals. In practice, a liquid crystal having a large difference between its refractive index for ordinary light and its refractive index for extraordinary light, i.e. a liquid crystal having a large refractive index anisotropy, is selected. The refractive index for ordinary light of this liquid crystal must coincide with that of the resin when an electric field is applied to the dispersion-type liquid crystal cell, in order to improve the transmissivity thereof. Generally, a liquid crystal material having a large refractive index anisotropy is a cyanobiphenyl-type liquid crystal. Although cyanobiphenyl liquid crystals can be easily manufactured, it has been difficult to fabricate cyanobiphenyl liquid crystal cells having high resistance, because they are liable to contain impurities, form dimers and to adhere to the substrate interface.

There are also problems in the fabrication method. The method of fabricating dispersion-type liquid crystals injects a mixture of a liquid crystal material and the precursors of an ultraviolet-setting resin, such as an acrylic resin, the mixture having a resin content in the range of 50 to 90%, into an empty cell, and irradiates the liquid crystal mixture in the cell with ultraviolet radiation to cure the liquid crystal mixture. When the liquid crystal mixture is irradiated with ultraviolet radiation, the precursors of the resin drift in the liquid crystal serving as a solvent, radicals produced by irradiating a reaction initiator collide against the precursors of the resin and the liquid crystal and, consequently, the resin is unable to set efficiently, the liquid crystal mixture needs to be irradiated for a comparatively long time, and intense ultraviolet radiation is required. As a result, it is needless to say that all of the above adversely affect the liquid crystal material itself.

Incorporating dispersion-type liquid crystals into an actual display will now be examined. It is expected that a liquid crystal device comprising, in combination, dispersed liquid crystal cells and thin-film transistors (TFTs) is applicable to form a high-definition liquid crystal display. When driving a TFT, a voltage is applied to the gate of the TFT, and a signal potential on the source side transfers to the drain side to apply a voltage to the liquid crystals. Thereafter, the gate closes and the space between the source and the drain reaches a high resistance state. The charge accumulated in the dispersion-type liquid crystal cell remains constant if there is no leak between the source and the drain and the charge in the dispersion-type liquid crystal cell is not consumed, thus a fixed voltage is applied to the dispersion-type liquid crystal cell. However, if the dispersion-type liquid crystal cell has a comparatively low resistance, the charge will be consumed within the dispersion-type liquid crystal cell, whereby the potential thereof is reduced.

Voltage retention can be used as a scale for evaluating this phenomenon. This is the ratio of the effective value of variation of the potential of the dispersion-type liquid crystal cell after the application of voltage to the effective value of the potential when the potential does not change. The voltage retention of a dispersion-type liquid crystal cell employing a cianobiphenyl liquid crystal is 50% or less, which is considerably low. The voltage-transmissivity characteristics of the dispersion-type liquid crystal cell when a rectangular pulse wave of substantially 100% in retention is applied to the dispersion-type liquid crystal cell and the voltage-transmissivity characteristics of the same when driven by the TFT differ significantly. If the voltage retention of the dispersion-type liquid crystal cell is 50% or less, a voltage twice the theoretical voltage or more must be applied to the dispersion-type liquid crystal cell to make the transmissivity of the dispersion-type liquid crystal cell equal that of a dispersion-type liquid crystal cell having a voltage retention of 100%.

Furthermore, such voltage retention often varies when a voltage is applied to the dispersion-type liquid crystal cell, and the voltage-transmissivity characteristic of the dispersion-type liquid crystal cell is subject to hysteresis, so that the transmissivity of the dispersion-type liquid crystal cell is not univocally dependent on the voltage applied to the dispersion-type liquid crystal cell, which makes gradation control difficult. Suppose that the difference between the threshold voltage and the saturation voltage of the voltage-transmissivity characteristics is 4 V and the gradation must be changed in sixteen steps. Then, the gradation must change one step when the voltage is changed $4/16=0.25$ V, which can be achieved only if the voltage retention is large. However, it is very difficult to display a satisfactory image by driving the TFTs in such a state.

SUMMARY OF THE INVENTION

Accordingly, it is an object of the present invention to provide a method of fabricating a dispersion-type liquid crystal electro-optical device comprising dispersion-type liquid crystal cells having high voltage retention.

A first aspect of the present invention is a method for forming a dispersion-type liquid crystal electro-optical device having a liquid crystal material and a transparent resin between a pair of substrates provided with electrodes, the method comprising the steps of applying an electric field from an external power source through the pair of electrodes to the liquid crystal material including uncured transparent resin and injected between the substrates, and curing (hardening) said uncured transparent resin.

A second aspect of the present invention is a method for forming the dispersion-type liquid crystal electro-optical device of claim 1, wherein when the uncured transparent resin is an ultraviolet ray curing resin, an ultraviolet ray is irradiated to the transparent resin for the hardening (curing), and when the uncured resin is a heat-curing resin (a thermosetting resin), a heat source is used to heat the resin for the hardening (curing).

A third aspect of the present invention is a method for forming a dispersion-type liquid crystal electro-optical device having a liquid crystal material and a transparent resin between a pair of substrates, the method comprising the steps of applying an electric field from an external power source through a pair of electrodes provided on a pair of substrates respectively to the liquid crystal material including uncured transparent resin and injected between the substrates and curing (hardening) the uncured transparent resin under the application of the electric field.

A fourth aspect of the present invention is a method for forming the dispersion-type liquid crystal electro-optical device of claim 3, wherein said curing (hardening) is carried out after current flowing between the pair of electrodes by the application of the electric field reaches a peak.

A fifth aspect of the present invention is a method for forming a dispersion-type liquid crystal electro-optical device having a liquid crystal material and a transparent resin, the method comprising the steps of applying an electric field from an external power source through a pair of electrodes sandwiching said liquid crystal material and said uncured transparent resin and curing (hardening) the uncured transparent resin.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
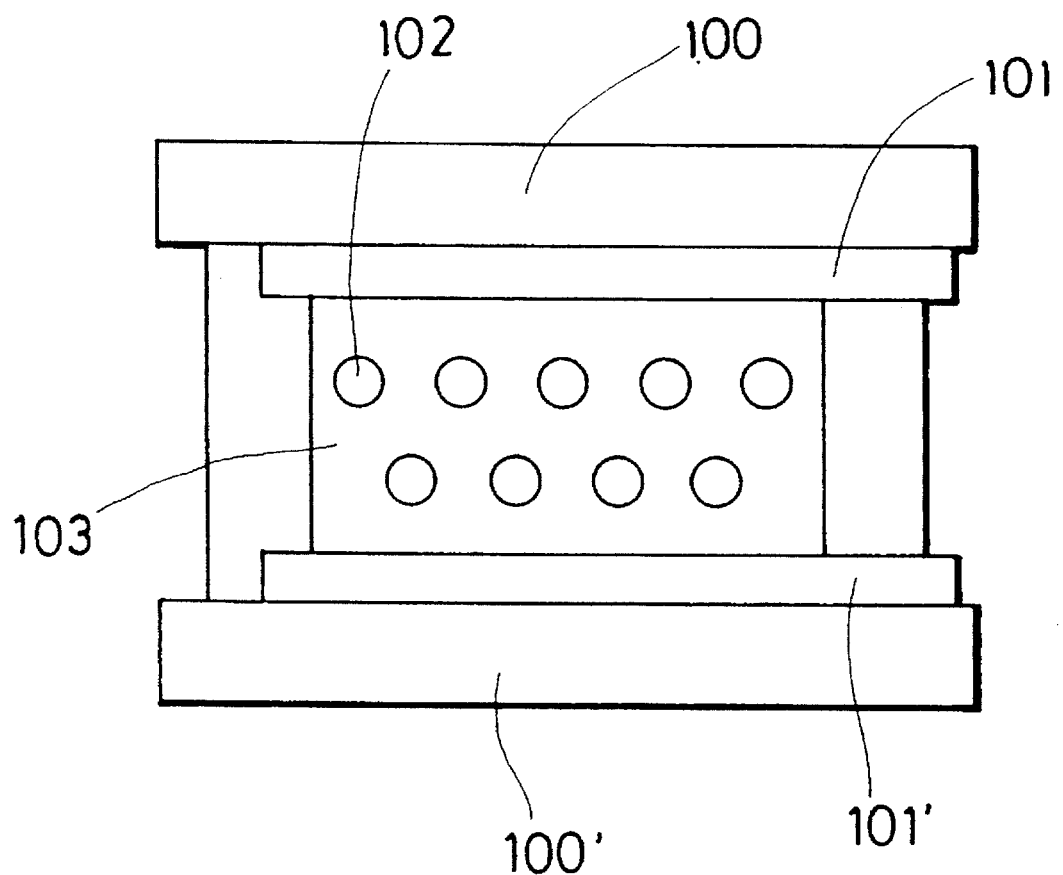
FIG. 1 is a schematic sectional view of a conventional dispersion-type liquid crystal cell.
Figure 2:
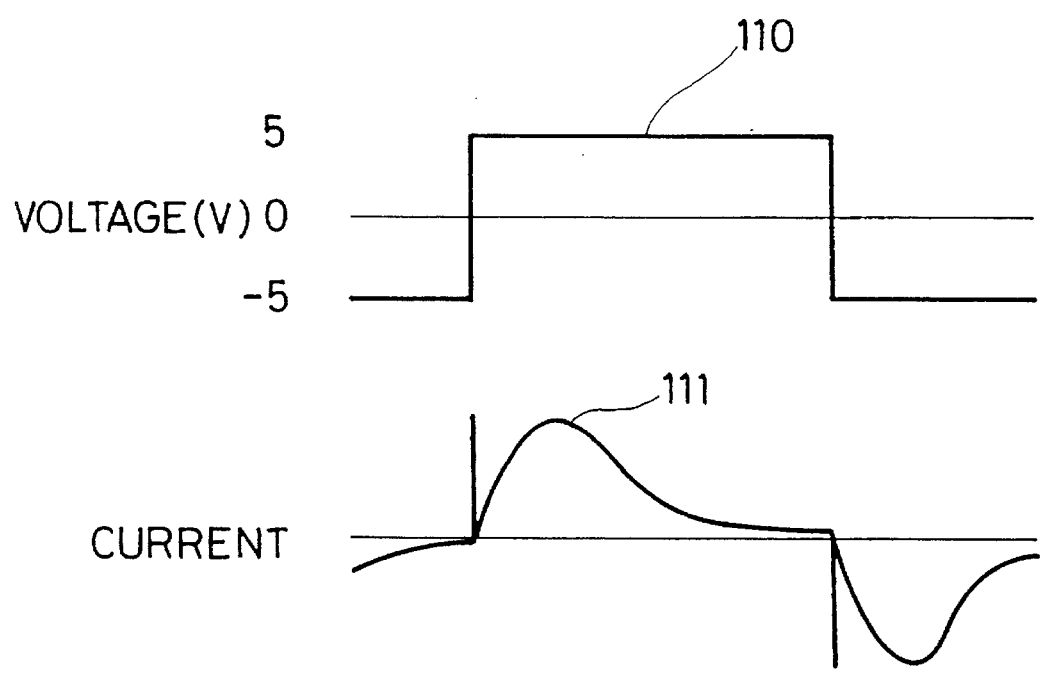
FIG. 2 is a graph showing the variation of charge.

Prior to the description of the preferred embodiments of the present invention, the electrical characteristics of a dispersion-type liquid crystal cell will be described. A liquid crystal material containing a resin is injected into a cell having a pair of transparent substrates facing each other each with an electrode formed on the inner surface thereof. Lead wires are connected to the electrodes and a square wave having, for example, a peak value of 5 V and a frequency of 10 Hz is applied thereto. While this wave is applied, the current flowing through the liquid crystal cell is measured. The measurement results are shown in FIG. 2. The current reaches its peak 111 in several tens of milliseconds from when the voltage direction 110 of the wave form changes, and the current decreases during the continued application of the electric field in the same direction. This indicates the existence of a charge which moves inside the cell and reaches the electrode surfaces by the electric field application. If a voltage in a fixed direction is applied, the moving charge in the central region of the cell decreases and the cell reaches a high resistance state. In other words, the existence of this type of charge in the liquid crystal material causes a reduction in the resistance. Accordingly, if the movement of the charge in the cell ceases and is immobilized in one place, the liquid crystal cell can maintain a high resistance.

The inventors of the present invention arrived at the present invention based on the above knowledge. In other words, the immobilization of a moving charge in the case of a liquid crystal of a liquid which is uniform between electrodes, such as TN liquid crystal, is difficult. However, in the case of a dispersion-type liquid crystal, a transparent resin is contained in the liquid crystal material, hence the above moving charge is collected in the resin portion, and sufficient voltage retention can be realized by immobilizing the moving charge.

Figure 3:
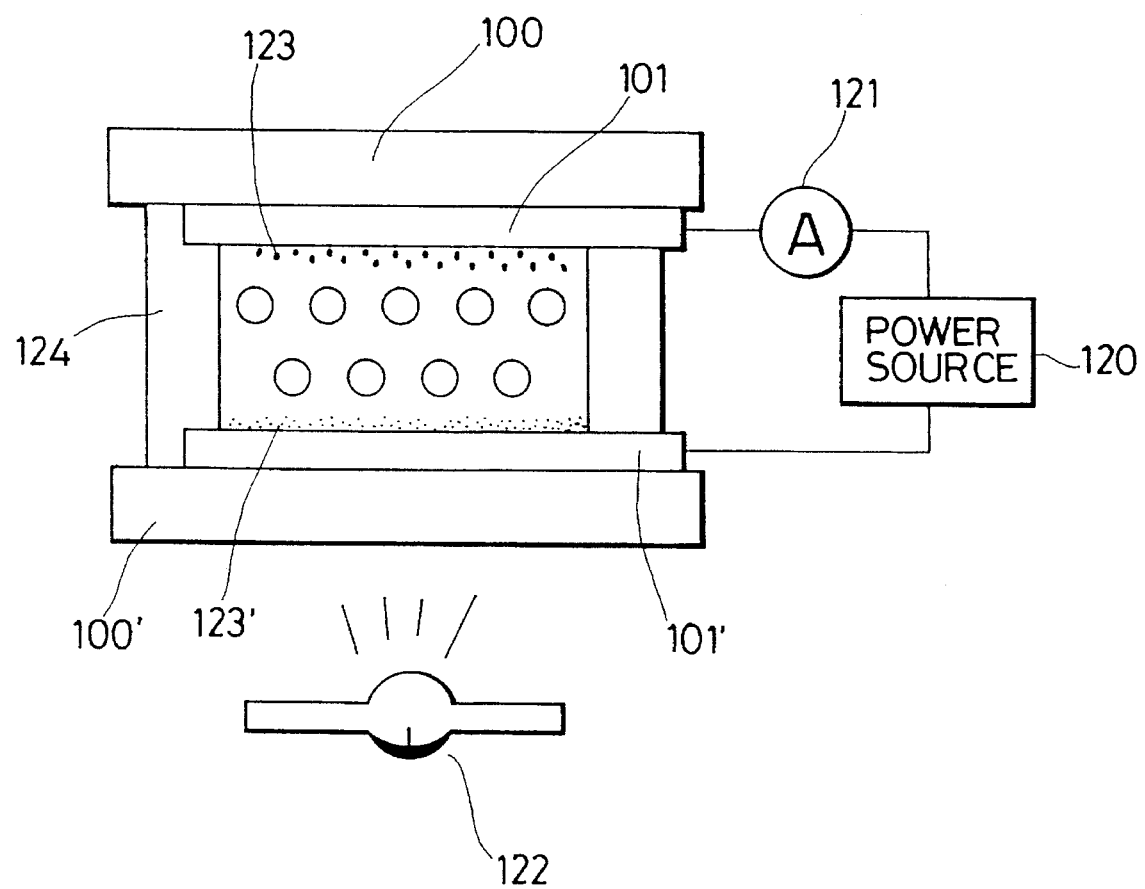
FIG. 3 is a schematic sectional view of assistance in explaining a method of fabricating a dispersion-type liquid crystal electro-optical device in a preferred embodiment according to the present invention.

Referring to FIG. 3, which shows an outline of the method of the present invention, a liquid crystal material containing a resin is injected into a cell accompanying electrodes 101 and 101'. A DC voltage is applied from a DC power source 120 for a fixed time period to the injected cell. A direct current electric field having a voltage value in the range of 1 to 10 V is applied between the electrodes for a specified time in the range of several seconds to several hundreds of seconds. The applied current may also be an AC voltage having a low frequency rather than a DC voltage. As a result the current flowing through the system can be measured by an ammeter 121, in which case the initial current intensity decreases from ⅕ to 1/100 times. The charge which decreases the type of resistance in the liquid crystal-resin mixture can be segregated in the vicinity of the electrodes. In this state, the liquid crystal mixture injected into the cell is exposed to ultraviolet radiation 122 emitted by an ultraviolet source or to heat generated by a heat source, not shown, to cure the transparent resin, and the charge is confined in the transparent resin. In particular, when the liquid crystal reaches a spherical ball state when the transparent resin is cured, resin rather than liquid crystal collects in the vicinity of the electrodes, hence the moving charge in those regions can be trapped in the resin and becomes immovable after the transparent resin is cured. Consequently, the resistance of the liquid crystal mixture can be maintained at a high level. Also, since the moving charge can be effectively moved and immobilized it is also effective to apply a voltage and cure (harden) the resin in a state where the temperature is higher than room temperature.

EXAMPLE 1

ITO electrode films (indium tin oxide films) of 1000 Å thickness were formed respectively on the surfaces of first and second transparent substrates 100 and 100' by a sputtering process. The sheet resistivity at this time was 30 Ω/cm. The thin ITO films were patterned by a photolithographic process to form a first transparent electrode 101 and a second transparent electrode 101' over the respective surfaces of the transparent substrates 100 and 100'. Silicon dioxide ball spacers were spread on the surface of the first transparent substrate 100 by a drying method, and seals 124 of epoxy resin were formed on the surface of the second transparent substrate 100' by screen printing. The transparent substrates 100 and 100' were laminated together and hot-pressed cured to form a cell having a thickness in the range of 9.8 to 10.2 μm.

A mixture of liquid crystal (BL001., Merck Co.) and ultraviolet-curing resin (NOA65., Norland Co.) was vacuum injected thereinto. The ordinary ray refractive index of the liquid crystal was 1.521 and the extraordinary ray refractive index was 1.746, while the refractive index of the NOA65 ultraviolet-setting resin was 1.524. The liquid crystal mixture must have high transmissivity when a voltage is applied and the axes of liquid crystal molecules are parallel to the direction of an electric field applied to the liquid crystal mixture. Therefore, the ordinary ray refractive index of the liquid crystal and the refractive index of the ultraviolet-setting resin must be equal.

On the other hand, in order to perform with an effective scattering characteristic when no electric field is applied, the difference between the respective refractive indices of the liquid crystal and the resin must be large; that is, a material whose liquid crystal refractive index anisotropy (the difference between the ordinary ray refractive index and the extraordinary ray refractive index of the liquid crystal) is large is selected. In this experiment, a liquid crystal (BL001) and ultraviolet-curing resin (NOA65), the weight ratio between which was 7:3, were mixed. The isotropic-nematic phase transition point (NI point) of the liquid crystal BL001 was 61° C., and the transition point of the liquid crystal mixture with resin was 19° C. The ultraviolet-setting resin must be cured in an isotropic phase state to produce a homogeneous PDLC. This was performed at a temperature in the range of from 25° to 35° C.

Figure 4:
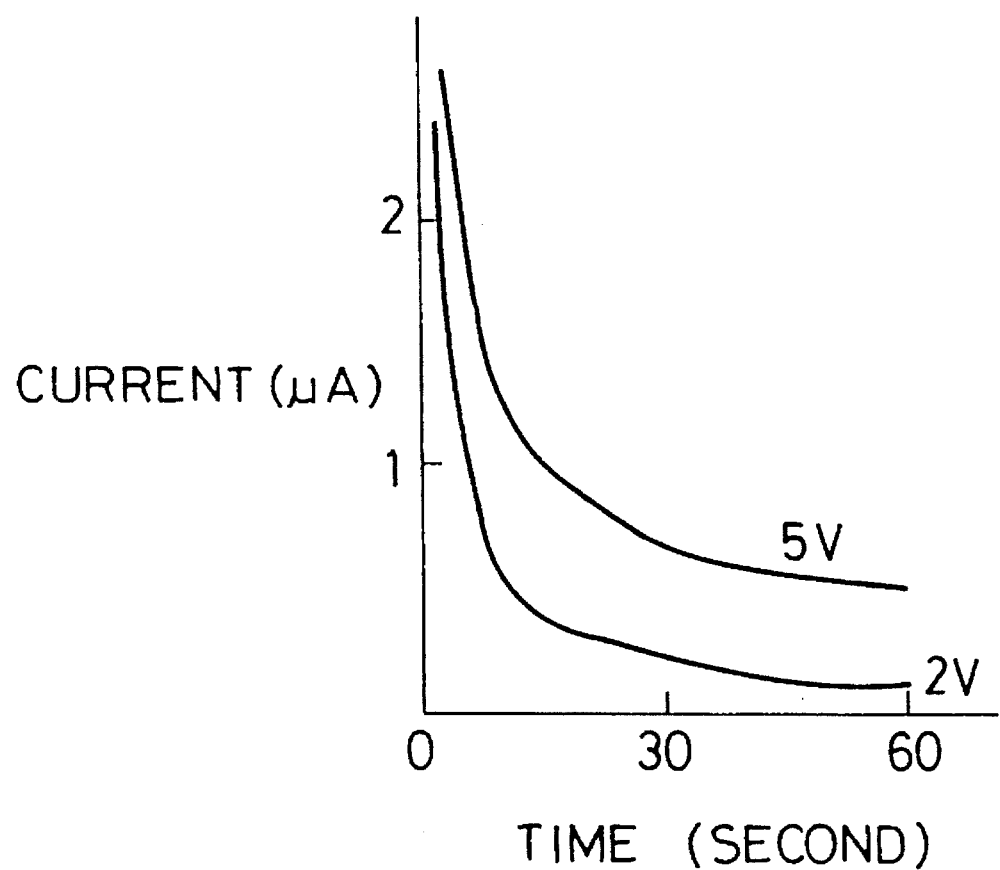
FIG. 4 is a graph showing the variation of current with time.

Lead wires were connected to the liquid crystal cell into which the liquid crystal/resin mixture was injected, and a direct current supplied thereto. In order to simultaneously perform comparisons in this experiment, voltages of 2 V and 5 V were applied to identically fabricated liquid crystal cells, and changes in the current flowing through the mixture were measured. FIG. 4 shows the results of measurements performed over a period of one minute. As is clear from FIG. 4, the value of the current flowing between the electrodes sandwiching the liquid crystal material decreased over a short time while the voltage was being supplied. Also, the current value was higher when the voltage was higher.

Thus, the distribution of the charge in the liquid crystal mixture can be controlled by the application of the voltage and the charge suspended in the liquid crystal/resin mixture can be collected in the vicinity of the electrodes by applying an electric field to the liquid crystal mixture. The liquid crystal mixture was irradiated with ultraviolet light emitted by a high-pressure mercury lamp 10 sec after the start of application of the voltage. Ultraviolet light was filtered by a band-pass filter of 365 nm to project only ultraviolet light of 365 nm in wavelength onto the liquid crystal mixture. The absorption wavelength of a reaction initiator contained in the ultraviolet-curing resin was 365 nm. Light having this absorption wavelength was most suitable for curing the resin. Also, unnecessary ultraviolet light does not contribute to curing the ultraviolet-curing resin and may contribute to the decomposition of the liquid crystal and create an unstable state therein.

The liquid crystal mixture was irradiated with ultraviolet light of 10 mW/cm² intensity for about two minutes, the resin cured, and the moving charged fixed. The voltage retention at the locations where it was measured in the PDLC at that time increased with the increase of the applied voltage, in where the applied voltage was 2 V, the voltage retention was about 55% and where 5 V was applied, voltage retention was about 68%. The dispersion-type liquid crystal thus fabricated had excellent electro-optical properties of 2% in transmissivity in the scattering state and 85% in transmissivity in a transmitting state when a voltage was applied.

Even where the temperature was increased during localization of the moving charge by voltage application, movement of the charge could easily be performed. The voltage retention of the dispersion-type liquid crystal cell fabricated by heating the liquid crystal mixture at 35° C. while a voltage of 2 V was applied to cure the liquid crystal mixture was greater by 5 to 22 points than that of the dispersion-type liquid crystal cell fabricated by curing the liquid crystal mixture without applying an electric field. However, were the liquid crystal mixture to be heated to an excessively high temperature at this time, the optical characteristics could not be said to be satisfactory, and in particular the transmissivity in the scattering state increased 10% to 40%. Therefore, a temperature appropriate to the characteristics of the liquid crystal and the type of transparent resin should be used.

EXAMPLE 2

Liquid crystal cells having the same construction as the liquid crystal cell of Example 1 were fabricated by the same processes. The cell gap of these liquid crystal cells was 10 µm. A liquid crystal mixture was prepared by mixing a liquid crystal (BL001., Merck Co.) and a transparent heat-curing resin (Epikote., Shell Chemicals Co.). The resin used here was an epoxy adhesive which is in liquid state at normal temperatures and has a molecular weight of 380. The ratio of resin to liquid crystal was 7:3, and the NI point of the liquid crystal mixture was below room temperature.

The voltage applied in processes for mass-producing liquid crystals cells and localizing moving charges was varied from 0 to 10 V to produce the PDLCs.

A voltage was applied to the liquid crystal mixture and the current peak measured. The liquid crystal mixture was cured at a temperature in the range of 70° to 120° C. while the voltage was applied, and a dispersion-type liquid crystal electro-optical device was completed.

Figure 5:
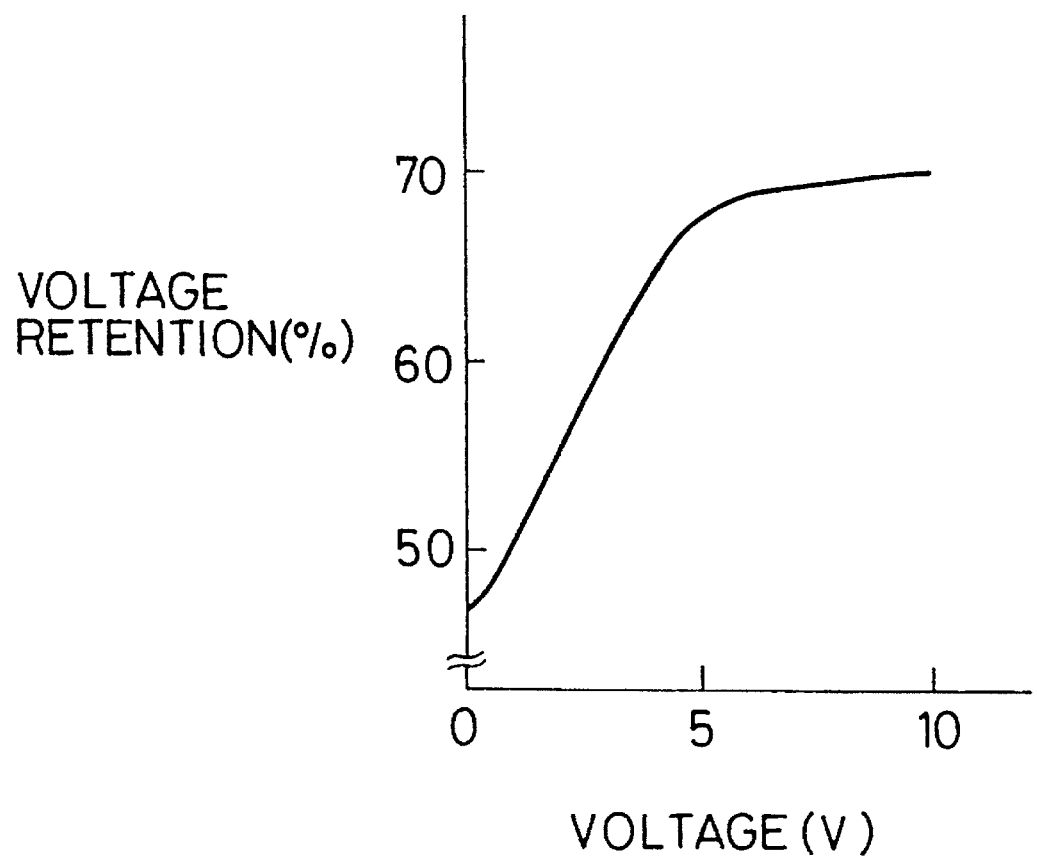
FIG. 5 is a graph showing the variation of voltage retention with voltage.

FIG. 5 shows the results of voltage retention measurements of a liquid crystal electro-optical device produced in the above manner. As is clear from FIG. 5, there is a region within which even if the voltage was increased beyond a certain voltage, the voltage retention remained unchanged. This tendency was universal regardless of the kind of the liquid crystal, the type of the transparent resin and the gap between the opposite substrates. Voltage retentions of dispersion-type liquid crystal cells to which an electric field of 0.5 V/µm or above was applied for the localization of the charge were substantially the same. Table 1 shows representative applied voltages and the values of optical characteristics of the dispersion liquid crystal cells for those voltages.

TABLE 1

| Voltage (V) | Field Strength (V/µm) | Voltage retention (%) | Transmissivity (Scattering) (%) |
| --- | --- | --- | --- |
| 0 | 0.0 | 52,0 | 3.0 |
| 2 | 0.2 | 58.0 | 4.0 |
| 4 | 0.4 | 67.0 | 3.5 |
| 6 | 0.6 | 68.0 | 4.0 |
| 8 | 0.8 | 69.5 | 4.0 |

The measured data tabulated in Table 1 confirms that the voltage retention of a PDLC fabricated by applying a voltage is considerably improved over a PDLC to which a voltage is not applied. The transmissivity in the scattering state at that time was kept to a low value. When an electric field of a field strength exceeding 1 V/µm was applied to the liquid crystal mixture while the transparent resin was being heated for curing, spherical liquid crystal balls increased to an excessively large diameter, due to which the transmissivity in the scattering state increased and consequently, the difference (contrast) between the transmissivity in the scattering state and that in the transmitting state when an electric field was applied to drive the liquid crystals of a picture, tended to become insufficient.

EXAMPLE 3

A dispersion-type liquid crystal cell provided with a polycrystalline silicon TFT was fabricated. A process of fabricating the polycrystalline silicon TFT will be briefly described prior to the description of the dispersion-type liquid crystal cell. A base silicon dioxide film was formed over the surface of a substrate (#7059., Corning Co.), an amorphous silicon semiconductor film as an active layer was formed over the silicon dioxide film by a CVD process, and a second silicon dioxide film as a protective layer was formed over the amorphous silicon semiconductor film. After thermal crystallization, a patterning process employing a dry etching method using carbon tetrafluoride was carried out, and then a third silicon dioxide film as a gate insulating film was formed.

Next an aluminum film for a gate electrode was formed by an electron beam evaporation process, the aluminum film was patterned, and then the aluminum film was subjected to an anodizing process to form an aluminum oxide layer. Phosphorus and boron were implanted in the amorphous silicon semiconductor film by an ion implanter, and then a source region and a drain region were activated by an excimer laser. Then, a layer insulating film, i.e., a silicon dioxide film, was formed over the aluminum film, the layer insulating film was patterned and electrodes were formed. Hydrogen annealing was carried out to complete a TFT.

A silicon nitride film as a protective layer was formed. An ITO film was formed by a sputtering process and patterned to form a pixel electrode. A liquid crystal cell of 10 µm in thickness having the same construction as described in Example 1 and provided with the substrate provided with the TFT was fabricated. The liquid crystal cell was injected by vacuum injection with a liquid crystal mixture containing a liquid crystal (BL001.) and a transparent ultraviolet-setting resin (NOA65.) in a 7:3 ratio.

The liquid crystal mixture was exposed to ultraviolet radiation while an electric field having a voltage of 3 V was applied between the electrode and the TFT to complete a liquid crystal layer PDLC. When light emitted by a metal halide lamp and projected on the dispersion-type liquid crystal cell was projected through an aperture and a lens on a screen, a clear image was formed on the screen, which proved that the dispersion-type liquid crystal cell has a high voltage retention. The image formed on the screen had a maximum luminance of 200 Cd/m a contrast ratio of 200:1.

Also, a voltage can be applied to the liquid crystal mixture without using the TFT and the electrode. The liquid crystal cell provided with the TFT was disposed between a pair of electrode plates disposed opposite each other with a gap of 3 mm therebetween before subjecting the liquid crystal cell to a resin curing process. A sufficient gap between the plates is one which is thicker than the thickness of two sheets of glass of liquid crystal cells. In this experiment the gap was set at 3 mm. A voltage of 900 V was applied to the 3 mm plate electrode gap to generate an electric field intensity the same as in the previous experiment (0.3 V/μm).

The assembly of the electrode plates and the liquid crystal cell was surrounded by an enclosure of an insulating material to screen light and, at the same time, ultraviolet radiation was applied to the liquid crystal mixture in a direction perpendicular to the direction of the electric field to complete a PDLC. The transparent resin can be cured satisfactorily even if ultraviolet radiation is not applied directly to the liquid crystal mixture from the top surface of the substrate when the surfaces of the electrodes of the electrode plates are mirror-finished. In the case of these means, exterior wiring need not be connected to the TFT substrate, and the PDLC can be fabricated by merely a normal liquid crystal panel fabricating process. By these means a liquid crystal display device having liquid crystal projection properties identical to the previously described examples can be obtained.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method for forming a liquid crystal electro-optical device comprising the steps of:

providing a mixture of a liquid crystal and a curable transparent resin between a pair of electrodes;

applying an electric field to said mixture in order to move mobile charges which are contained in said liquid crystal to said resin; and hardening said transparent resin to fix said mobile charges in said resin, wherein said electric field is applied until an electric current flowing through said liquid crystal reduces to $\frac{1}{5}$ to $\frac{1}{100}$ of an initial current.

2. The method of claim 1 wherein said transparent resin comprises an ultraviolet ray curing resin, and said hardening is carried out by irradiating said transparent resin with an ultraviolet ray.

3. The method of claim 1 wherein said transparent resin comprises a thermosetting resin, and said hardening is carried out by heating said transparent resin.

4. The method of claim 1 wherein said electric field is not lower than 0.5 V/μm.

5. The method of claim 1 wherein said hardening is carried out at a temperature higher than room temperature.

6. A method for forming a liquid crystal electro-optical device comprising the steps of:

providing a mixture of a liquid crystal and a curable transparent resin between a pair of electrodes;

applying an electric field to said mixture in order to move mobile charges which are contained in said liquid crystal to said resin; and then hardening said transparent resin to fix said mobile charges in said resin, wherein the application of said electric field is continued during said hardening and wherein said electric field is applied until an electric current flowing through said liquid crystal reduces to $\frac{1}{5}$ to $\frac{1}{100}$ of an initial current.

7. The method of claim 6 wherein said transparent resin comprises an ultraviolet ray curing resin, and said hardening is carried out by irradiating said transparent resin with an ultraviolet ray.

8. The method of claim 6 wherein said transparent resin comprises a thermosetting resin, and said hardening is carried out by heating said transparent resin.

9. The method of claim 6 wherein said electric field is not lower than 0.5 Vμm.

10. The method of claim 6 wherein said hardening is carried out at a temperature higher than room temperature.

11. The method of claim 6 wherein said hardening is carried out after current flowing between said electrodes by the application of said electric field reaches a peak.

12. The method of claim 8 wherein said transparent resin is hardened at a temperature of 70° to 120° C. by said heating.

13. The method of claim 6 wherein said electric field is a DC electric field.

14. A method for forming a liquid crystal electro-optical device comprising the steps of:

providing a mixture of a liquid crystal and a curable transparent resin between a pair of electrodes;

applying a DC electric field to said mixture in order to move mobile charges which are contained in said liquid crystal to said resin; and hardening said transparent resin to fix said mobile charges in said resin, wherein said electric field is applied until an electric current flowing through said liquid crystal reduces to $\frac{1}{5}$ to $\frac{1}{100}$ of an initial current.

15. The method of claim 14 wherein said transparent resin comprises an ultraviolet ray curing resin, and said hardening is carried out by irradiating said transparent resin with an ultraviolet ray.

16. The method of claim 14 wherein said transparent resin comprises a thermosetting resin, and said hardening is carried out by heating said transparent resin.

17. The method of claim 14 wherein said electric field is not lower than 0.5 Vμm.

18. The method of claim 14 wherein said hardening is carried out at a temperature higher than room temperature.

19. The method of claim 1, 6 or 14 wherein said mixture and said pair of electrodes are supported by a pair substrates.

* * * * *